Jan. 27, 1953 F. O. JOHNSON 2,626,999
CONTROL DEVICE
Filed March 7, 1950 6 Sheets-Sheet 1
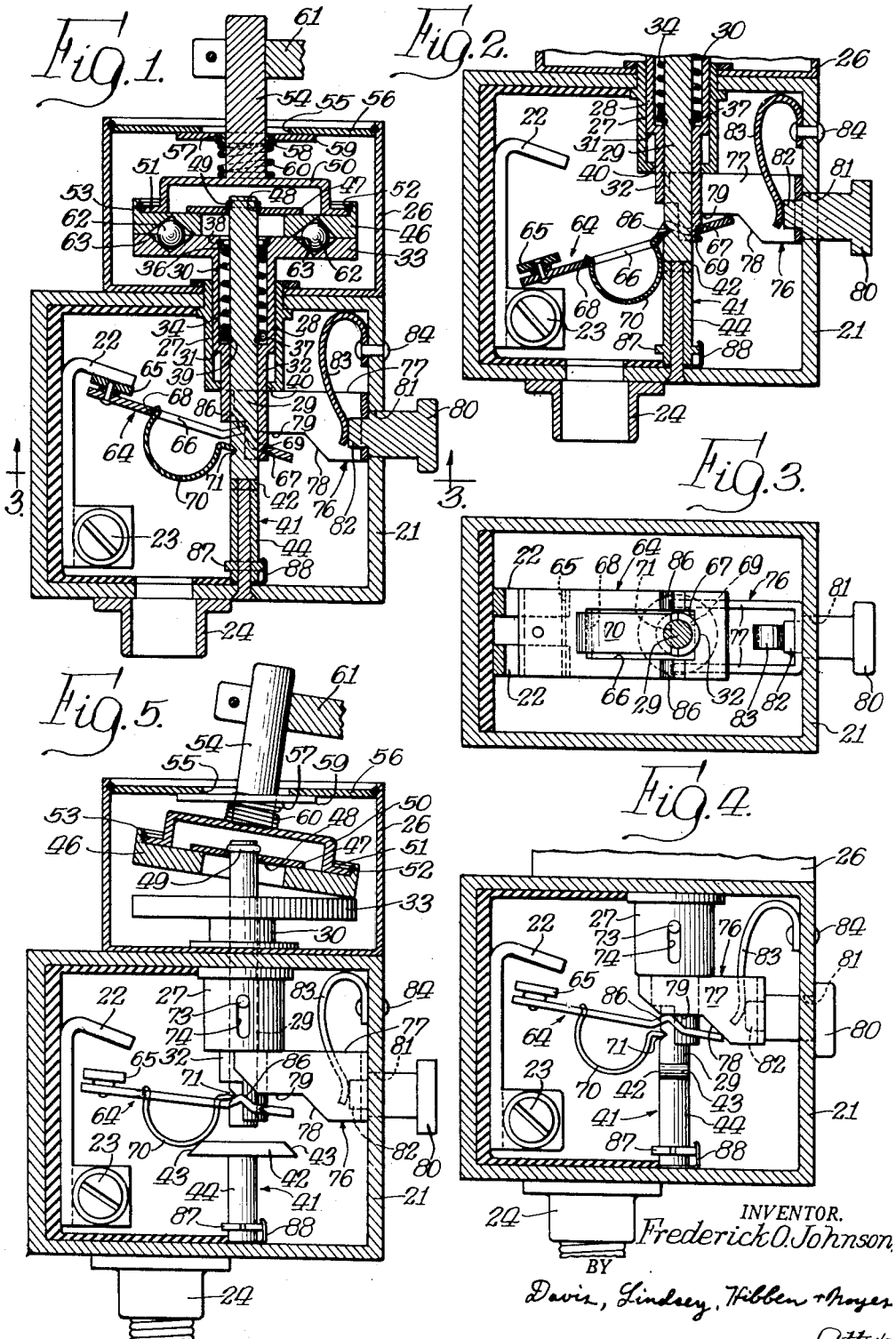
INVENTOR.
Frederick O. Johnson
BY Davis, Lindsey, Hibben + Noyes
Atty's.

Jan. 27, 1953  F. O. JOHNSON  2,626,999
CONTROL DEVICE
Filed March 7, 1950  6 Sheets-Sheet 2
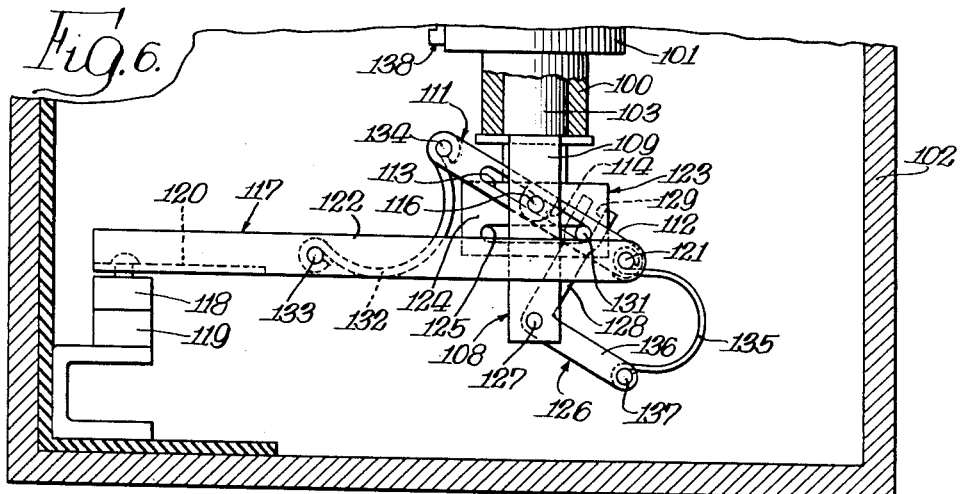
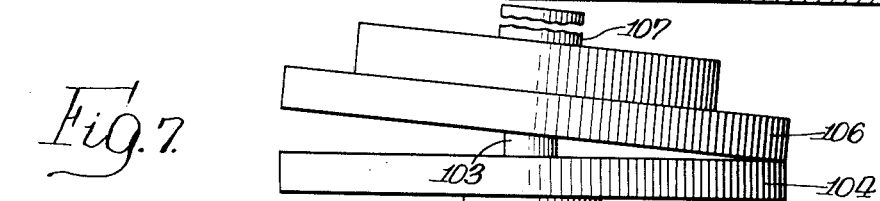
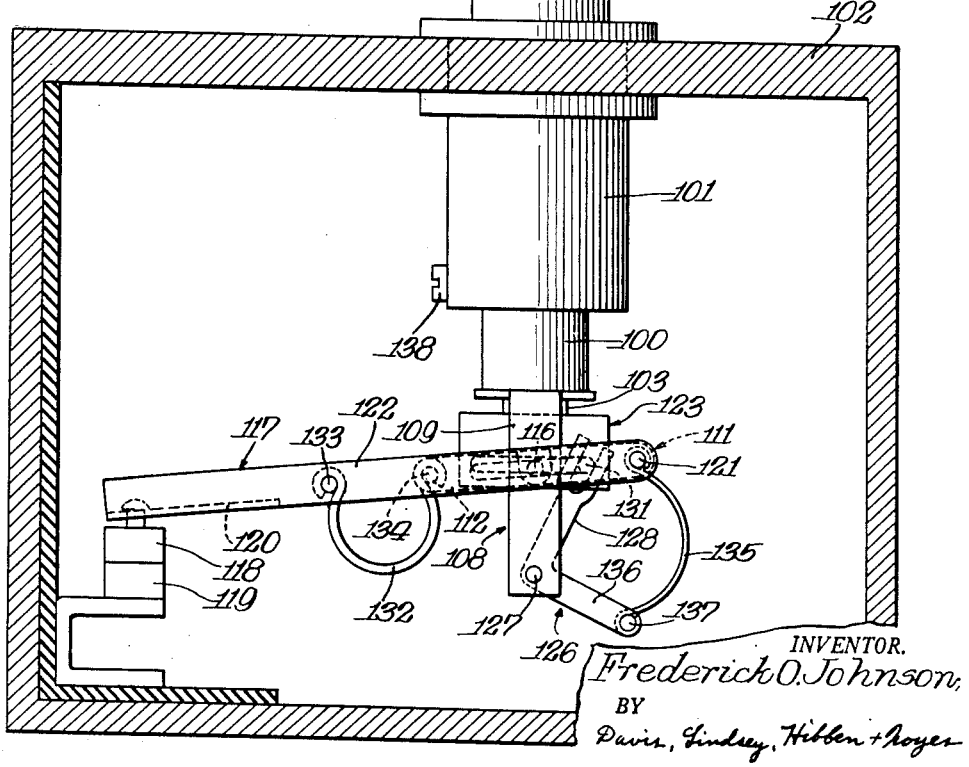
INVENTOR.
Frederick O. Johnson,
BY Davis, Lindsey, Hibben + Noyes
Atty's.

Jan. 27, 1953 F. O. JOHNSON 2,626,999
CONTROL DEVICE
Filed March 7, 1950 6 Sheets-Sheet 3
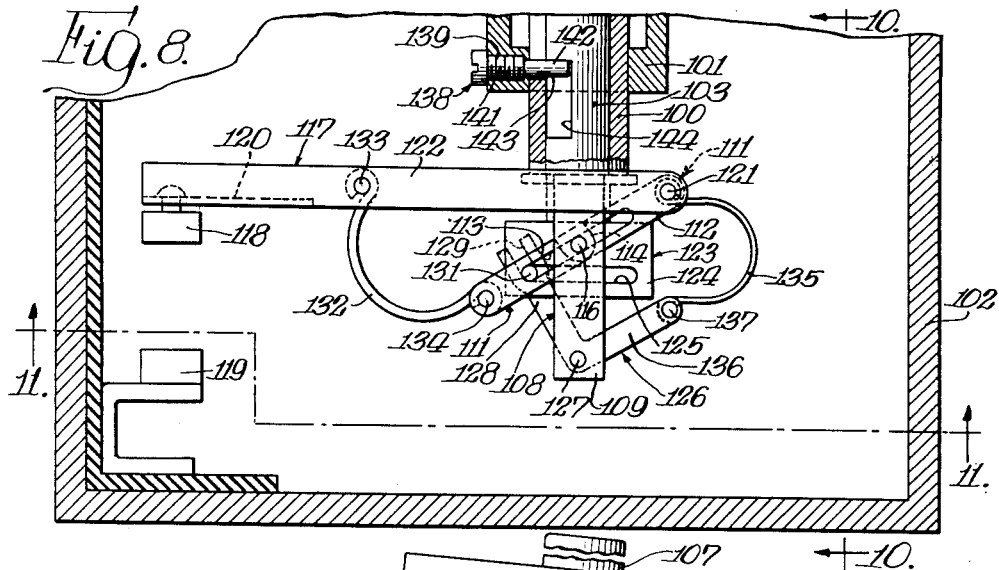
Fig. 8.
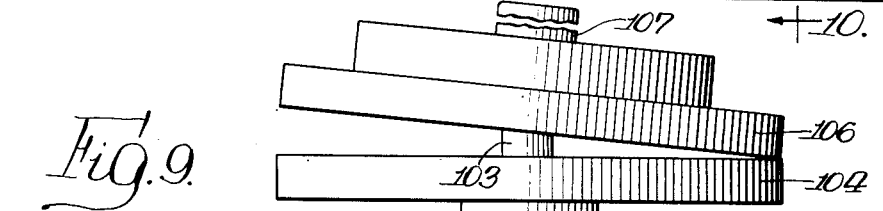
Fig. 9.
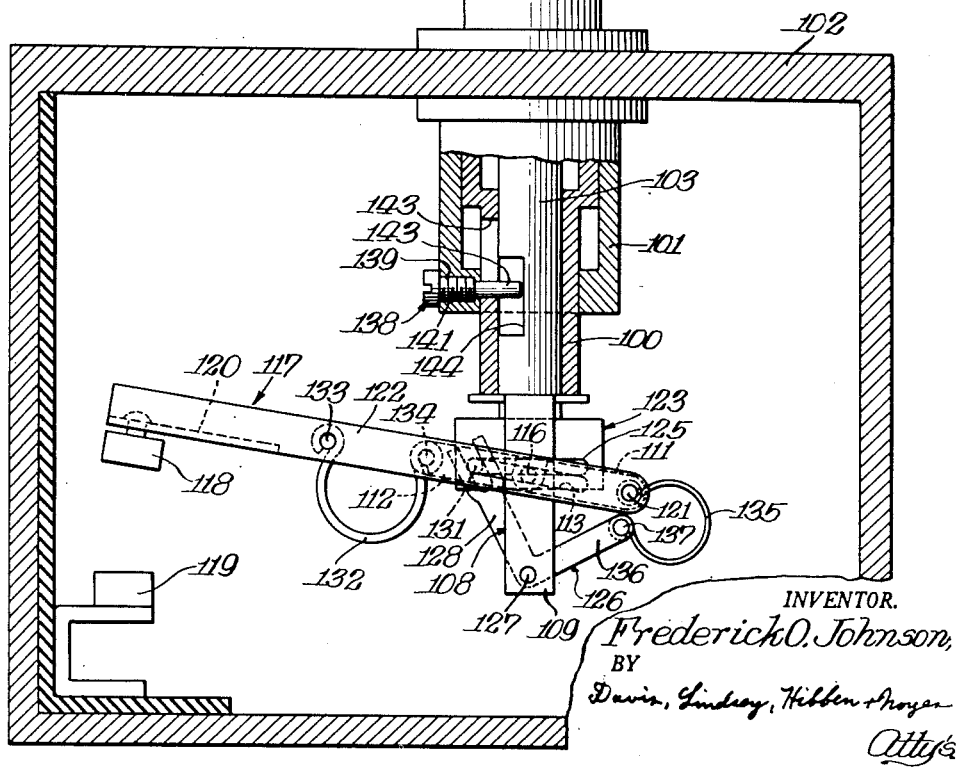
INVENTOR.
Frederick O. Johnson,
BY
Davis, Lindsey, Hibben & Noyes
Atty's Jan. 27, 1953 F. O. JOHNSON 2,626,999
CONTROL DEVICE
Filed March 7, 1950 6 Sheets-Sheet 4

INVENTOR.
Frederick O. Johnson,
BY
Davis, Lindsey, Hibben & Noyes
Attys.

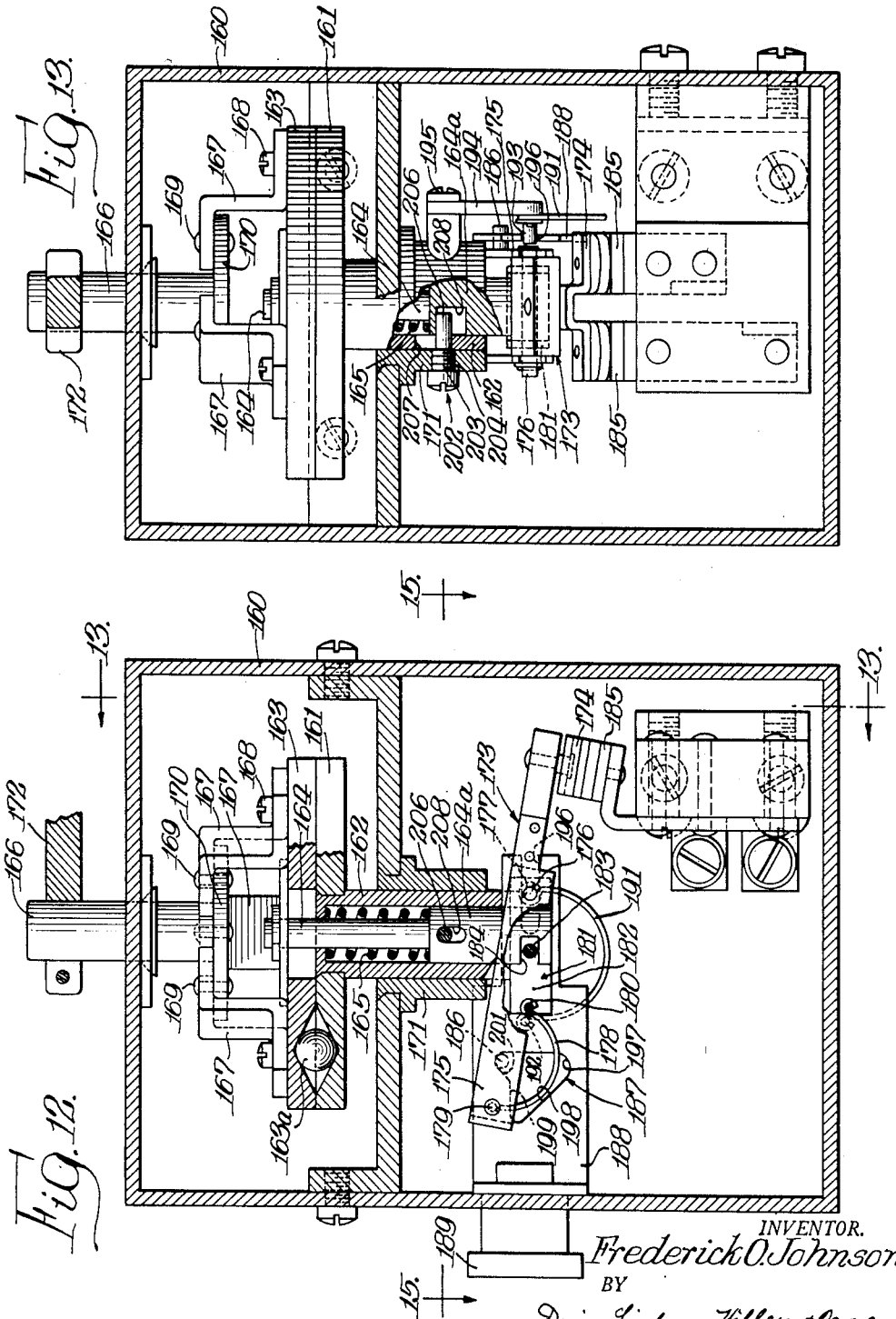

Jan. 27, 1953     F. O. JOHNSON     2,626,999
CONTROL DEVICE
Filed March 7, 1950     6 Sheets-Sheet 6
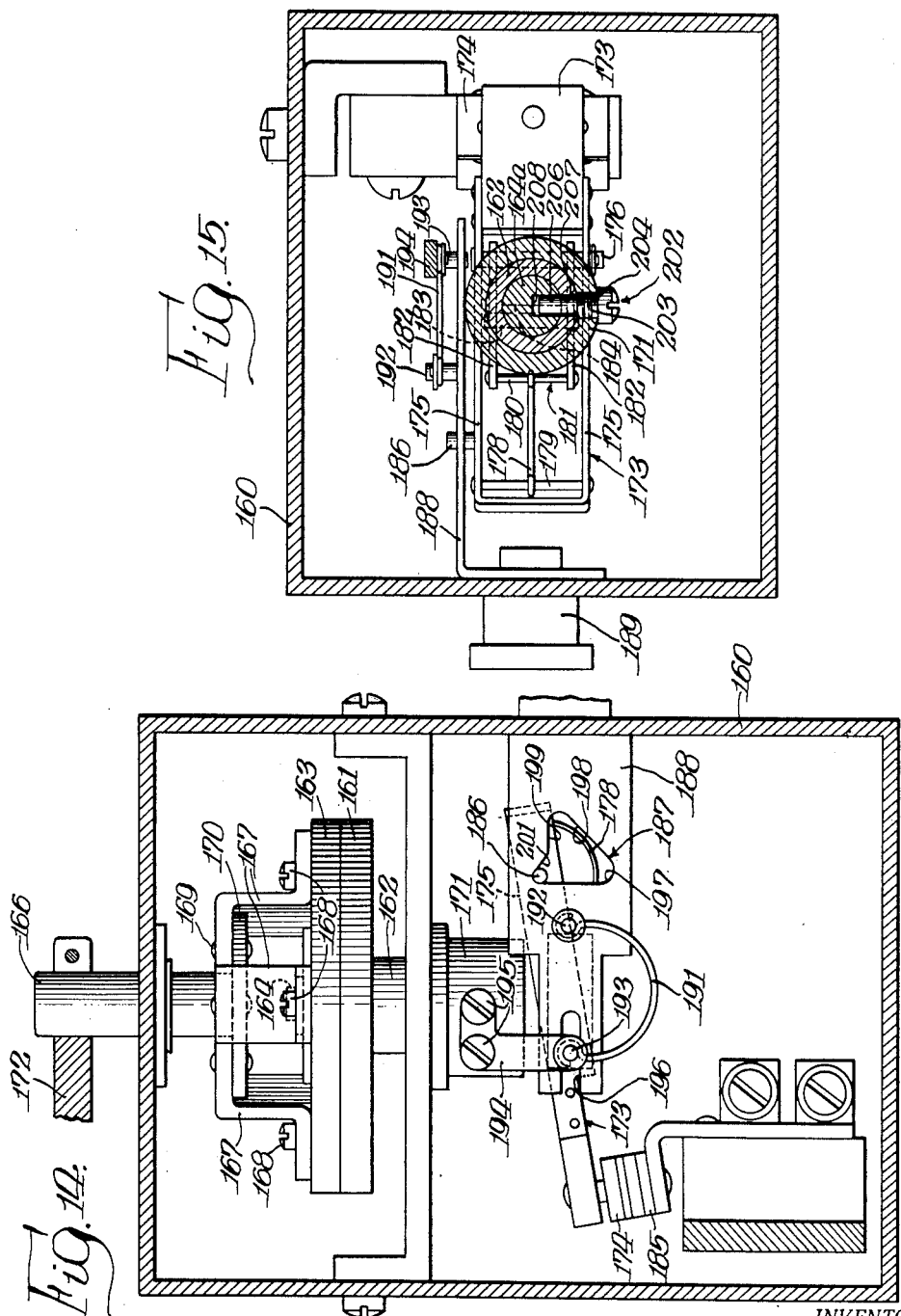
INVENTOR.
Frederick O. Johnson,
BY Davis, Lindsey, Hibben + Noyes
Atty's Patented Jan. 27, 1953

2,626,999

UNITED STATES PATENT OFFICE 2,626,999

CONTROL DEVICE

Frederick O. Johnson, Chicago, Ill.

Application March 7, 1950, Serial No. 148,194

25 Claims. (Cl. 200—67)

This invention relates generally to control devices for controlling the operation of a moving part of a machine and more particularly to the combination of an electric switch and an actuating mechanism for the switch.

Various control devices have been proposed heretofore in the machine tool and related arts for controlling the normal operation of a moving machine part or for use as safety devices to stop the operation of the part in an emergency. However, the utility of such devices has often been limited to certain special situations and the devices in many cases have been characterized by undesirable or disadvantageous operating features. For example, some control devices heretofore suggested are not sufficiently sensitive to function satisfactorily either as a normal operating control or as a safety device. Other previously suggested control devices possess the disadvantage that they may be actuated to effect the desired control by movement of a contact member in only a certain direction or in only a certain manner. Moreover, many of such control devices are not sufficiently flexible in design to permit their installation on existing machines or to be adjusted readily to meet changing operating requirements.

Accordingly, the general object of my invention is to provide a novel combination of an electric switch, adapted to control the operation of a moving machine part, and an operating mechanism for actuating the switch, said combination being free from the aforementioned operational disadvantages and being of such flexible and adjustable design as to find ready application to a wide variety of control problems.

Another object of the invention is to provide a novel device of the class described including an electric switch and a mechanism for operating the switch which is highly sensitive both from the standpoint of requiring the application of only a relatively small force against a contact member to cause actuation of the mechanism and from the standpoint that movement of the contact member in any direction or in any manner through only a small distance will effect such actuation.

A further object of the invention is to provide a novel device of the class described including a switch-operating mechanism and an electric control switch having a movable electric contact element which is actuated directly by the operating mechanism to break the electric circuit.

An additional object of the invention is to provide a novel device of the class described which is non-blockable, i. e. which cannot readily be rendered inoperative or incapable of accomplishing the desired control by deliberate or improper manipulation of the device.

Another object of the invention is to provide a novel device of the class described which automatically resets after actuation.

Still another object of the invention is to provide a novel device of the class described in which a first actuation of the operating mechanism effects the desired control and a second actuation of the mechanism resets the device for normal operation.

Other objects and advantages of the invention will become apparent from the subsequent detailed description taken in connection with the accompanying drawings in which:

Fig. 1 is a vertical sectional view of one form of a control device embodying the features of my invention and showing a switch with a movable element thereof in "on" position;

Fig. 2 is a fragmentary view similar to Fig. 1 but showing the movable switch element in "off" position;

Fig. 3 is a horizontal sectional view of the device taken along the line 3—3 of Fig. 1;

Fig. 4 is a vertical sectional view similar to Figs. 1 and 2 but showing the manner in which the movable switch element is reset;

Fig. 5 is a vertical sectional view similar to Fig. 1 but showing a different method of utilizing the device;

Fig. 6 is a vertical sectional view of a control device comprising a different embodiment of my invention with the switch in "on" position;

Fig. 7 is a view similar to Fig. 6 but showing the switch at an intermediate stage moving from "on" to "off" position;

Fig. 8 is a view similar to Figs. 6 and 7 but showing the switch in "off" position;

Fig. 9 is a view similar to Figs. 6, 7, and 8, but showing the switch at an intermediate stage moving from "off" to "on" position;

Fig. 12 is a vertical sectional view of a control device comprising still another embodiment of my invention;

Fig. 13 is a vertical sectional view taken along the line 13—13 of Fig. 12;

Fig. 14 is a vertical sectional view similar to Fig. 12 but taken from the opposite side; and Fig. 15 is a horizontal sectional view taken along the line 15—15 of Fig. 12.

Figure 10:
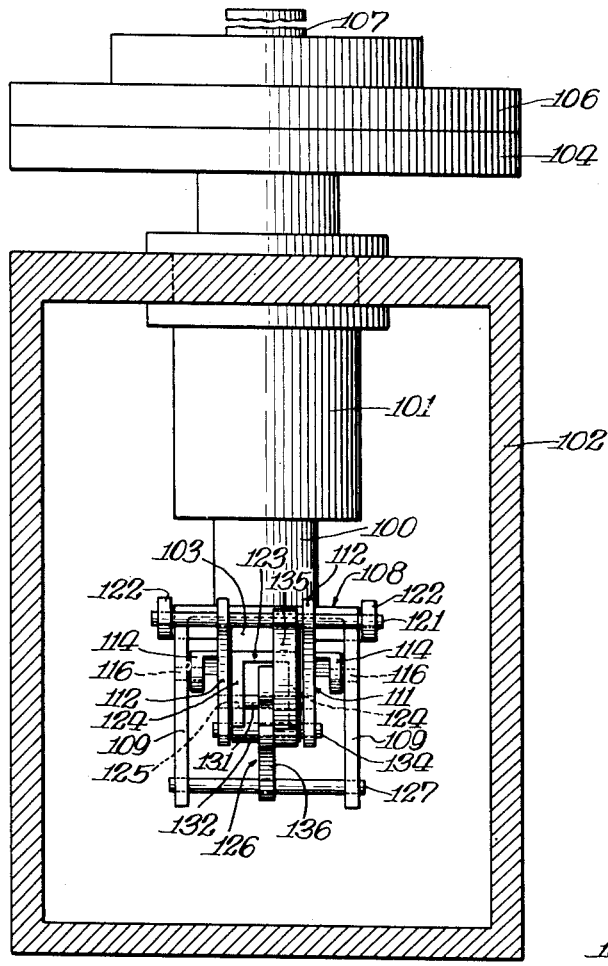
Fig. 10 is a vertical sectional view taken along the line 10—10 of Fig. 8.

As mentioned above, a control device embodying the features of my invention is adapted either for controlling the normal operation of a moving part of a machine or as a safety device to stop operation of the part in an emergency. When utilized in the first manner, the device comprises an automatic means for operating an electric switch to effect reversal, stoppage, or a change in speed of a given moving part or to effect the movement of some other part of the machine at a certain stage in the movement of the given part. When used as a safety means, the device is adapted to be actuated either intentionally by the operator of the machine or merely by being engaged as an incident to the involuntary actions of the operator should he find himself endangered by having his clothing or a portion of his body caught in the machine.

In the present instance the invention will be described primarily with reference to its use as a safety device. To this end, the device comprises broadly an electric switch having a movable electric contact element adapted to be shifted by an actuating mechanism from "on" to "off" position for interrupting or breaking an electric circuit. The switch may be included at any suitable point in an electric circuit for operating a machine or machine tool, e. g. a drill press or the like. The actuating mechanism for the movable electric contact element of the switch comprises motion translating means, hereinafter described in detail, which directly actuates the electric contact element in response to movement in any direction of a contact member such as a guard member engageable by the operator.

Reference is made to my prior Patent No. 2,482,487 issued September 20, 1949 wherein a drill press is shown having a guard ring surrounding the drill at a point where it will not interfere with normal operation of the drill press but may be readily contacted by the operator in an emergency. The guard ring is movable in all directions and is rigidly connected to a universal motion translating mechanism so that movement of the ring in any direction upon contact therewith by the operator, whether intentional or involuntary, will be transposed into such movement as will cause an electric switch to be shut off and thereby stop all movement of the drill press. The present invention involves the combination of a novel and improved form of electric switch and operating means therefor including a universal motion translating mechanism coacting with the switch, it being understood that for use of the invention as a safety device the motion translating mechanism may be connected to and actuated by any suitable contact member located in proximity to the moving machine part, such as the guard ring in the drill press arrangement shown in my prior patent.

The universal motion translating means of the present invention comprises generally a pair of differential movable members actuable by displacement of a guard member or other contact member and operably connected to the movable electric contact element of the switch. The movable members are movable both independently and conjointly to effect the desired operation of the switch, it being understood that whether one or both members move, the result is always differential movement or relative movement of the members in opposite directions. As will appear hereinafter, the pair of differential movable members are preferably arranged in a concentric manner for both conjoint and independent sliding movement.

Referring first to Figs. 1 to 4, one specific embodiment of my invention comprises a switch housing 21 having a pair of fixed electric contact elements 22 rigidly secured in laterally spaced relationship (Fig. 3) to an inner wall thereof and adapted to be connected by screw fasteners, such as shown at 23, to the usual conductors or wires (not shown) which may extend into the housing 21 through an inlet 24. A casing 26 is mounted above the switch housing 21 for enclosing portions of the operating mechanism of the device, and a fixed sleeve 27 is provided extending downwardly from the casing 26 into the housing 21 through aligned openings in the adjacent walls of the casing and housing for receiving a pair of movable members as hereinbefore mentioned.

The movable members, in the present instance, comprise a second sleeve 28 slidably disposed within the fixed sleeve 27 and an elongated rod 29 slidably disposed within the second sleeve 28 in concentric relation therewith and extending downwardly beyond the fixed sleeve 27. The sleeve 28 is formed with an upper portion 30 of enlarged diameter for sliding engagement with the fixed sleeve 27, a shoulder portion 31, and a lower portion 32 of restricted diameter in sliding contact with the rod 29 and depending below the fixed sleeve 27. The upper end of the enlarged portion 30 of the sleeve 28 terminates in a flange 33 which is normally urged upwardly by a helical spring 34 encircling the rod 29 within the sleeve and retained between a pair of thrust washers 36 and 37. A pair of spring rings 38 and 39 are seated in the flange 33 and the rod 29, respectively, for holding the thrust washers 36 and 37 whereby the spring 34 normally urges the flange 33 and the sleeve 28 upwardly and the rod 29 is normally urged downwardly. Downward movement of the sleeve 28 is limited by engagement of the shoulder 31 with an inwardly directed flange 40 at the lower end of the sleeve 27. The rod 29 is limited in its downward movement by engagement at its lower end with a rotatable pedestal indicated generally at 41 and comprising a transversely extending bar 42 having slanted or beveled outer edges, as at 43, and rigidly secured at the upper end of a rotatable post 44.

The upper end of the rod 29 is engaged with an annular disk 46 by means of a universal connection comprising a retaining plate 47 having a central aperture 48 with outwardly slanted edges, the rod 29 extending upwardly through the aperture 48 and having a retainer in the form of a spring ring 49 mounted thereon for coaction with the retaining plate 47, as hereinafter described. A cup-shaped member 50 having a flange 51 is mounted against the upper face of the disk 46 and is retained thereon by means of a spring ring 52 coacting between the periphery of the flange 51 and an upright rim 53 on the disk 46. A stud 54 is rigidly secured to the cup-shaped member 50 and extends upwardly through an enlarged aperture 55 in a closure plate 56 mounted at the top of the casing 26. The disk 46 is normally held in engagement with the upper face of the flange 33 by means of the spring 34, as hereinbefore described. A thrust collar 57 is loosely carried on the stud 54 and is formed with a rounded outer periphery which seats in the rounded edges of a complementary opening 58 in a retainer plate 59 slidably disposed below the plate 56 and of greater extent than the aperture 55 whereby to permit movement of the stud 54 in any direction. A helical spring 60 is provided on the stud 54 between the cup-shapd member 50 and the thrust collar 57 for holding the collar 57 and the retainer plate 59 against the closure plate 56 but permitting sliding movement of the plate 59 relative to the plate 56.

The outer end of the stud 54 projecting beyond the casing 26 may be connected through any suitable rigid connections, such as a clamp indicated fragmentarily at 61, with a suitable guard member disposed in close proximity to the moving machine part or other mechanism with which it is desired to employ the present invention as a safety device. As previously mentioned, one particular type of guard member which may be interconnected with the stud 54 is shown in the form of a guard ring in my prior Patent 2,482,487, but it will be apparent that other suitable contact members may also be employed.

Movement of the stud 54 in any manner or in any direction upon actuation or displacement of the interconnected guard member will result in differential movement between the members 28 and 29 either singly or conjointly. Thus, upward or tilting movement of the stud 54 and the attached disk 46 causes the rod 29 to be lifted upwardly relative to the sleeve 28. A retaining pin 73 (Fig. 4) projects outwardly from the enlarged portion 30 of the sleeve 28 through a slot 74 in the fixed sleeve 27 thereby preventing upward movement of the sleeve 28 when the rod 29 is lifted upwardly. If the stud 54 is moved downwardly, the disk 46 presses the flange 33 and the attached sleeve 28 downwardly relative to the rod 29, downward movement of the latter being prevented by contact with the pedestal 41. Similarly, combined upward movement of the rod 29 and downward movement of the sleeve 28 may occur under certain conditions.

The flange 33 and the disk 46 are provided with a plurality of balls 62 (Fig. 1) positioned in a plurality of conical pockets 63 in the opposed faces of the flange and disk so that relative rotation or relative lateral movement between the flange and disk will cause separation thereof to the extent of the diameter of the balls 62 and thus will effect relative movement between the two movable members 28 and 29.

For bridging the gap between the fixed electric contact elements 22, a movable electrical contact element is provided in the form of an elongated lever or switch arm, indicated generally at 64, which has secured to one end thereof a transverse bar 65 comprising an electric conductor adapted to complete an electric circuit between the elements 22 when the lever 64 is in "on" position. The lever 64 is provided with a rectangular slot 66 (Fig. 3) having its opposite ends formed with knife edges, as indicated at 67 and 68, the knife edge 67 being pivotally received in a notch 69 at the lower end of the movable sleeve 28. A bowed spring shown at 70 is provided for imparting a snap action to the lever 64, one end of the bowed spring 70 being disposed against the knife edge 68 of the slot 66 and the opposite end of the spring 70 being received in a notch 71 in the rod 29 adjacent the lower end thereof.

In operation the action of the two movable members comprising the sleeve 28 and the rod 29 is such as to cause the switch arm 64 to be moved from "on" to "off" position in response to movement of any type or in any direction of the stud 54 which is rigidly connected through the clamping means 61 with a suitable operator contact member or guard member as hereinbefore described. Thus, when the switch arm 64 is in "on" position, as shown in Fig. 1, upward or tilting movement of the stud 54 causes the rod 29 to be lifted upwardly relative to the sleeve 28 thereby raising the fulcrum point of the bowed spring 70 in the notch 71 until the fulcrum point is carried over-center of the arm 64 whereupon the spring 70 forces the arm 64 downwardly with a snap action to its "off" position, as shown in Fig. 2. In addition, if the stud 54 is moved downwardly, the sleeve 28 will be thrust downwardly thereby carrying the pivot knife edge 67 in the notch 69 below the fulcrum point of the spring 70 in the notch 71 so that the spring 70 forces the arm 64 downwardly to its "off" position, as shown in Fig. 2, with a similar snap action.

In addition to the above described types of differential movement between the sleeve 28 and the rod 29, it will also be understood that combined upward movement of the rod 29 and downward movement of the sleeve 28 will also produce the same effect on the switch arm 64. Moreover, rotary movement which may be imparted to the stud 54 will result in relative rotation between the disk 46 and the flange 33 whereupon the balls 62 will effect separation between the flange and disk to produce a similar differential movement of the members 28 and 29 and thereby throw the switch arm 64 to "off" position in the same manner. Relative lateral movement between the disk 46 and the flange 33 will also produce the same result.

During actuation of the motion translating mechanism comprising the movable members 28 and 29, relative rotation of the movable sleeve 28 within the fixed sleeve 27 is prevented by means of the retaining pin 73 projecting outwardly from the enlarged portion 30 of the sleeve 28 through the slot 74 in the fixed sleeve 27. Another important operating feature of the device is that the spring 34 (assisted to some extent by the spring 57) functions as a spring return to restore the motion translating mechanism automatically to normal position after actuation and release thereof, the switch arm 64 remaining in "off" position after return of the members 28 and 29 to normal position.

To reset the switch arm 64 after it has been shifted to the "off" position shown in Fig. 2, a U-shaped or yoke member, indicated generally at 76, is provided, having a pair of spaced parallel arms 77 each being formed with a sloping portion 78 and a horizontal portion 79. An operating button 80 is slidably positioned in an aperture 81 in the switch housing 21 and extends at its inner end 82 through the end wall of the yoke 76 and is rigidly fastened thereto for actuating the yoke. A spring in the form of a bent clip 83 is secured at one end to the side wall of the switch housing 21, as by a rivet 84, and engages at its other end the inner end 82 of the button 80 for normally urging the latter outwardly of the housing 21 and thereby retaining the yoke 76 in retracted position (Fig. 2). The arms 77 underlie the fixed sleeve 27 and are slidably guided thereby during movement of the yoke 76.

When the switch arm 64 is in its "off" position and the button 80 is in its normal outermost position, as shown in Fig. 2, the arm 64 may be reset to "on" position by manually depressing the button 80 inwardly against the action of the spring 83 to engage the sloping portions 78 of the arms 77 with the adjacent end of the arm 64 and thereby pivot the arm 64 upwardly about the knife edge 67 by the camming action of the slanted portions 78. A pair of raised portions or humps 86 are provided on the arm 64 on opposite sides of the slot 66 adjacent the knife edge 67, and when the arm 64 is cammed upwardly by the yoke 76, the humps 86 abut the horizontal portions 79 of the arms 77 so that the switch arm 64 assumes the intermediate position shown in Fig. 4 but is prevented from snapping into "on" position as long as the yoke 76 is depressed inwardly. Upon release of the button 80, the spring 83 returns the yoke 76 to its normal retracted position and the horizontal portions 79 of the arms 77 are disengaged from the humps 86 thereby freeing the switch arm 64 and permitting the spring 70 to return the same to "on" position as shown in Fig. 1. It will be seen that by this arrangement it is impossible for an operator or user of the device to deliberately block or obstruct its normal operation by jamming or improperly manipulating the reset button to hold the switch closed. As a result of this non-blockable feature, the switch can be returned to operative position for completing the electric circuit to the machine only after the button 80 has been depressed and then released so that the safety or control features of the device are always in operative condition when the switch is closed.

Referring now to Fig. 5, a slightly different manner of utilizing the device is illustrated. In Figs. 1–4, the horizontal bar 42 of the pedestal 41 extends substantially perpendicularly to the longitudinal axis of the switch arm 64 so that the bar 42 does not interfere with the bowed spring 70 during pivotal movement of the switch arm 64 between "on" and "off" positions. In Fig. 5, the pedestal 41 is shown after rotation through 90° relative to the position shown in Figs. 1 to 4 so that the horizontal bar 42 extends into the path of movement of the bowed spring 70. A peripherally notched disk 87 is provided adjacent the base of the rotatable post 44 and coacts with a rigidly fastened upright retainer or spring clip 88 which engages the notched portions of the disk 87 for holding the pedestal 41 in either of its two positions.

With the pedestal 41 in the position shown in Fig. 5, it will be seen that downward movement of the switch arm 64 is limited by engagement of the bowed spring 70 with the adjacent beveled edge 43 of the bar 42. As a result when the universal motion translating mechanism comprising the movable members 28 and 29 returns to normal position after actuation thereof, the fulcrum end of the spring 70 seated in the notch 71 will be positioned below the center line of the switch arm 64 thereby causing the spring 70 to return the arm 64 upwardly to "on" position. Thus, with this mode of operation of the device the switch arm 64 automatically resets itself after actuation and release of the stud 54 and return of the universal motion translating mechanism to its normal undisturbed position. Accordingly, with the pedestal 41 in the position shown in Fig. 5, it will be seen that it becomes unnecessary to employ the reset mechanism comprising the yoke 76 and the operating button 80.

For certain uses of my device, for example where the device is intended primarily for safety or guard purposes, the non-blockable and manually resettable operation depicted in Figs. 1 to 4 will be most appropriate. For other uses of the device, however, such as in a limit control for controlling the extent of movement of a machine part, the automatically resetting mode of operation illustrated in Fig. 5 may be desired. Either mode of operation of the device may be realized merely by rotating the pedestal 41 to the appropriate angular position relative to the bowed spring 70.

Figure 11:
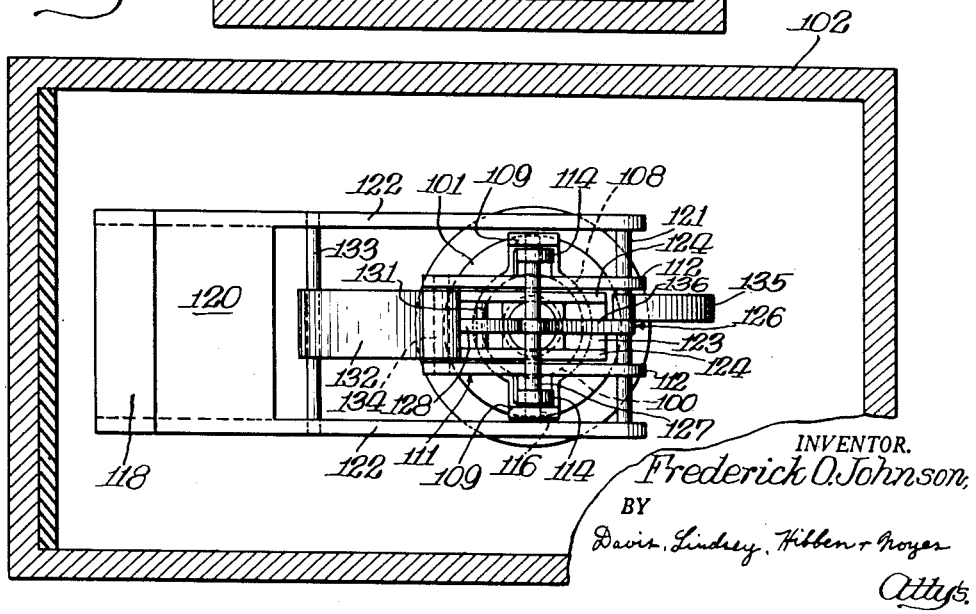
Fig. 11 is a horizontal sectional view taken alone the line 11—11 of Fig. 8.

In Figs. 6 to 11 a different embodiment of my invention is illustrated in which one actuation of a motion translating mechanism will either close or open the electric circuit and a second or successive actuation of the mechanism will cause the reverse action. Thus, this form of the invention is likewise particularly suited for use as a limit switch or other type of off-and-on control device.

The switch-operating mechanism in this embodiment of my invention need not be described in detail since it is generally similar to the arrangement shown in Figs. 1 to 5 and comprises a movable sleeve 100 slidably mounted in a fixed sleeve 101, which is secured to the upper wall of a switch housing 102, and a movable elongated rod 103 extending concentrically within the sleeve 100. The sleeve 100 is formed with a flange 104 at its upper end which coacts with a disk 106 having the upper end of the rod 103 connected thereto for universal movement. A stud 107 is operably attached to the disk 106 and is adapted to be connected by suitable means (not shown) to a guard member or other contact member for transmitting movement of the latter to the differential elements comprising the movable members 100 and 103. The operation of this portion of the device is similar to the operation of the corresponding structure shown in Figs. 1 to 5 and it will be understood that the operating mechanism includes a spring return for automatically returning the mechanism to its former position after actuation thereof.

An outer yoke member 108 having a pair of spaced depending legs 109 is rigidly secured to the lower end of the movable sleeve 100. A rocker 111 comprising a pair of elongated parallel side pieces 112 having longitudinal slots 113 is pivotally supported for rocking movement between the legs 109 and means of a pair of lugs 114 (Fig. 10) projecting outwardly from the side pieces 112 and provided with a pair of pivot pins 116 journaled in the legs 109. A movable contact element in the form of an elongated switch arm or lever 117 having a cross bar 118 swiveled at one end thereof for bridging a pair of fixed contact elements 119 is pivotally supported at its opposite end on the rocker 111. The switch arm 117 may be conveniently formed from a metal sheet or strip having its side edges turned up, as at 122, and having the center portion cut away to leave a closed end portion 120. A pin 121 extends through the sides 112 of the rocker 111 and the sides 122 of the arm 117 for pivotally connecting the same.

An inner yoke member 123 having a pair of spaced parallel sides 124 is rigidly fastened to the lower end of the movable rod 103 for vertical movement intermediate the sides 112 of the rocker 111. The sides 124 of the inner yoke member 123 extend transversely on opposite sides of the rod 103 and are provided with longitudinal slots 125 adjacent the lower edges thereof. For imparting rocking movement to the rocker 111, a bell crank 126 is pivotally supported on a pin or shaft 127 extending between the lower ends of the legs 109 on the yoke 108. One leg 128 of the bell crank 126 is bifurcated, as at 129, and a transverse connecting pin 131 extends through the bifurcated portion 129 and also through the slots 125 in the yoke 123 and thence through the slots 113 in the rocker 111. For providing a snap action during opening and closing movement of the switch arm 117, a bowed spring 132 is attached at one end to a pin 133 extending between the side 122 of the switch arm 117 and is attached at its opposite end to the rocker 111 by means of a cross pin 134 extending between the sides 112. For actuating the bell crank 126, another bowed spring 135 is connected at one end to the other arm 136 of the bell crank 126 by means of a pin 137 and is also attached to the pivot pin 121 which connects the rocker 111 to the switch arm 117.

In operation, the switch arm 117 is shifted by snap action in both directions between "on" and "off" positions upon differential movement of the movable members 100 and 103. Thus, in Fig. 6 the switch is shown in closed or "on" position with the bell crank 126 rocked to its extreme right-hand position and with the connecting pin 131 disposed at the right-hand ends of the slots 113 and 125. In Fig. 7, the disk 106 is shown in tilted or lifted position relative to the flange 104, as a result of displacement of an interconnected operator contact member (not shown), thereby causing the rod 103 to be lifted upwardly relative to the sleeve 100. Upward movement of the rod 103 causes the attached yoke 123 to be lifted upwardly whereby the connecting pin 131 rotates the rocker 111 in a counterclockwise direction about the pins 116 to the intermediate position shown in Fig. 7. At this point the right-hand end of the switch arm 117, as viewed in Fig. 7, has been moved upwardly and the right-hand end of the bowed spring 132 has been swung downwardly. Further rotation of the rocker 111 to a slight extent in this direction causes the right-hand end of the bowed spring 132 to be carried downwardly into overcenter relation with respect to the longitudinal axis of the switch arm 117 with the result that the bowed spring 132 causes the left-hand end of the switch arm 117 to swing upwardly with a snap action to its horizontal "off" position, as seen in Fig. 8. During this operation, the bowed spring 135 is energized or spread outwardly at its ends (Fig. 7) so that when the movable rod 103 is returned to its normal position by the spring return mechanism (not shown), the inner yoke 123 is likewise moved downwardly to its initial position and the energized spring 135 acting on the bell crank 126 shifts the connecting pin 131 to the opposite ends of the slots 113 and 125 thereby swinging the left-hand end of the rocker 111 downwardly to the position shown in Fig. 8.

In the position shown in Fig. 8 the switch is in "off" position and the device is reset for operating in the reverse manner upon the next movement of the actuating mechanism. For example, as shown in Fig. 9, the rod 103 has again been lifted upwardly by relative movement between the disk 106 and the flange 104 whereby the inner yoke 123 lifts the connecting pin 131 and rotates the rocker 111 in a clockwise direction. Thus, the right-hand end of the rocker arm 111 swings downwardly carrying with it the right-hand end of the switch arm 117 to the intermediate position shown in Fig. 9. Further clockwise movement of the rocker 111 causes the right-hand end of the bowed spring 132 to be carried upwardly beyond the center line of the switch arm 117 into overcenter relationship therewith so that the left-hand end of the switch arm 117 is moved with a snap action downwardly into the "on" position shown in Fig. 6. During this movement of the switch, the spring 135 has been energized in a reverse fashion by compression of its ends toward each other (Fig. 9) and upon return of the yoke 123 to normal position the energized spring 135 pivots the bell crank 126 in a clockwise direction whereby to shift the connecting pin 131 to the opposite ends of the slots 113 and 125 and return the rocker 111 to its reset position. The switch mechanism is thereby returned to the position shown in Fig. 6 and the above-described sequence of operations is repeated upon each successive actuation of the motion translating mechanism.

Although the operation of this form of the invention has been described only in connection with the downward movement of the rod 103 having the yoke 123 attached thereto, it will be understood that the same result follows from any form of differential movement between the members 100 and 103, either independently or conjointly. Thus, the sleeve 100 having the yoke 108 attached thereto may move downwardly relative to the rod 103 to produce the same effect hereinbefore described. Similarly, simultaneous upward movement of the rod 103 and downward movement of the sleeve 100 may also occur to produce the same result on the switch mechanism.

In all such independent or conjoint movement of the elements 100 and 103, the extent of movement of the respective members is limited by a retainer in the form of a screw 138 (Figs. 8 and 9) having an enlarged threaded portion 139 adjacent its outer end for cooperation with a threaded bore 141 in the fixed outer sleeve 101. A pin portion 142 of restricted size is provided at the opposite end of the screw 138 and extends inwardly through a slot 143 in the movable sleeve 100 into a recess or groove 144 in the rod 103. Thus, in the position shown in Fig. 8, further downward movement of the rod 103 or further upward movement of the sleeve 100 is prevented by the inner end 142 of the pin 138 engaging the upper edge of the groove 144 and the lower edge of the slot 143. In the same manner, downward movement of the sleeve 100 and upward movement of the rod 103 are limited by engagement of the pin 138 with the opposite edges of the slot 143 and the groove 144. It will also be understood that the screw 138 prevents relative rotary movement of the elements 100 and 103 with respect to the fixed sleeve 101.

In Figs. 12 to 15 I have illustrated a modified form of the device shown in Figs. 1 to 5. In this embodiment of the invention, the switch operating mechanism and the universal motion translating mechanism are generally similar to the arrangement shown in Figs. 1 to 5. A switch housing 160 encases a flange 161 affixed to the upper end of a movable sleeve 162 and also encases a cooperating disk 163, the disk and flange being separated by a plurality of balls 163a and the disk 163 having a central movable rod 164 operatively connected thereto and extending downwardly therefrom within the sleeve 162 for differential movement relative to the sleeve 162. The device also comprises a spring return including a helical spring 165 mounted on the rod 164 and retained between an enlarged lower portion 164a and the flange 161 for normally urging the latter against the disk 163.

The disk 163 is also operably connected to a stud 166 by means of a plurality of angular brackets 167 rigidly fastened adjacent their lower ends to the disk 163, as by screws 168. The brackets 167 extend inwardly adjacent their upper ends toward the stud 166 and are fastened, as by rivets 169, to a plate 170 which is secured to the lower end of the stud 166 whereby tilting or angular movement of the latter causes corresponding tilting or lifting movement of the disk 163 relative to the flange 161. As in the previously described form of the invention, the movable sleeve 162 and the movable rod 164 extend concentrically within a fixed sleeve 171. Also, it will be understood that the stud 166 is rigidly connected by suitable means, shown only fragmentarily by a clamp 172, to an operator contact or guard member adjacent the machine or tool with which the device is employed.

A movable electric contact element in the form of a U-shaped switch arm 173 having a transversely extending contact bar 174 swiveled at one end thereof and comprising a pair of elongated spaced side portions 175 is pivotally carried on a pin 176 extending between the sides 175 and through a transverse groove 177 adjacent the lower end of the sleeve 162. For imparting a snap action during pivotal movement of the switch arm 173 about the pin 176, a bowed spring 178 is connected at one end to a pin 179 extending between the sides 175 at the opposite end of the switch arm. The other end of the bowed spring 178 is attached to a pin 180 at one end of a yoke, indicated generally at 181, which comprises a pair of parallel side portions 182 disposed between the sides 175 of the switch arm 173 and pivotally supported on the pin 176. For operatively connecting the yoke 181 with the rod 164, a cross pin 183 is provided between the sides 182 extending through and seated in a transverse groove or recess 184 adjacent the lower end of the enlarged portion 164a of the rod 164.

In operation, this form of the invention functions in a similar manner to the embodiment shown in Figs. 1 to 5. Thus, when the device is in "on" position as viewed in Fig. 12, upward movement of the rod 164 in response to tilting of the disk 163 produces upward swinging movement of the yoke 181 until the pin 180 carrying the inner end of the bowed spring 178 moves the latter to overcenter position relative to the axis of the switch arm 173 thereby pivoting the switch arm in a counterclockwise direction and with a snap action to "off" position, the bar 174 thereby being disengaged from its bridging position between a pair of fixed electric contacts indicated at 185. In addition, downward movement of the sleeve 162 relative to the rod 164 will produce a like effect on the switch arm 173 as will also conjoint differential movement of the rod 164 and the sleeve 162.

For resetting the switch arm 173 after it has been moved to "off" position, a pin 186 projects outwardly from one of the sides 175 and extends into coacting relation with a generally triangular cam slot or aperture 187 formed in a shiftable resetting arm 188. The arm 188 extends outwardly from the adjacent wall of the switch housing 160 and is provided with an operating button 189 for manually moving the arm 188 inwardly and outwardly relative to the housing.

For normally retaining the arm 188 in outwardly extended position, a bowed spring 191 is provided having one end fastened to a pin 192 projecting outwardly from the arm 188 and having its opposite end secured to a pin 193 carried at the lower end of a depending bracket or arm 194 which is rigidly mounted, as by a pair of screws 195, on the fixed sleeve 171. The inner end of the resetting arm 188 is formed with an endwise slot 196 within which the pin 193 is received for guiding inward and outward movement of the arm 188.

It will be understood that when the switch arm is in "off" position, i. e. in its oppositely pivoted position from the position shown in Figs. 12 to 15, the pin 186 will be disposed adjacent the lowermost corner of the cam slot 187, as indicated at 197. Consequently, upon inward movement of the resetting arm 188 against the action of the spring 191, the pin 186 is cammed upwardly along the sloping edge of the cam slot 187, indicated at 198, whereby to pivot the switch arm 173 about its fulcrum pin 176 in a clockwise direction, as viewed in Fig. 12, and swinging the left-hand end of the spring 178 overcenter with respect to the arm 173. The upper edge of the cam slot 187 is formed with a straight horizontal portion 199 which engages the pin 186 after the camming movement effected by the slanted cam edge 198 and thereby prevents the switch arm 173 from reaching its final "on" position until the button 189 has been released. By release of the operating button 189, the bowed spring 191 returns the arm 188 to its normal outwardly extended position and the pin 186 is disengaged from the horizontal portion 199 of the cam slot 187 thereby permitting the pin 186 to be received in the upper corner portion, indicated at 201, of the cam slot 187 as the arm 173 is further rotated under the force of the bowed spring 178.

Thus, the presently described form of my invention is likewise characterized by non-blockable operation as in the form of the invention illustrated in Figs. 1 to 5. In other words, it is impossible to reset the switch arm 173 to "on" position for completing the electrical circuit until the button 189 has been pressed inwardly and then released, the safety features of the device thereby always being in operative condition when the switch arm 173 is in "on" position.

For preventing rotary movement and for limiting the extent of vertical movement between the members 162 and 164, a retainer screw 202 (Fig. 13) similar to the arrangement shown in Figs. 6–11 is also provided. The screw 202 has a threaded portion 203 cooperating with a threaded aperture 204 in the fixed sleeve 171 and an inner pin portion 206 extending through a slot 207 in the movable sleeve 162 and into a recess 208 in the enlarged portion 164a of the rod 164.

Although the invention has been described in detail with reference to several specific structural embodiments, it will be understood that various modifications and equivalent structures may be employed without departing from the scope of the invention as defined in the appended claims.

I claim:

1. A control device of the character described comprising motion translating means including a pair of elongated movable members arranged for both independent and conjoint longitudinal movement, an electric switch having a movable electric contact element operatively supported on one of said members for pivotal movement between "on" and "off" positions, and spring means operatively disposed between one of said members and said contact element for effecting snap action pivotal movement of the latter in response to longitudinal movement of at least one of said members.

2. A control device of the character described comprising motion translating means including a pair of concentric slidable operating members adapted to move both independently and conjointly, an electric switch having a movable electric contact element carried by one of said operating members for pivotal movement between "on" and "off" positions, and a bowed spring in engagement at one end thereof with said electric contact element and in operative engagement at its other end with one of said operating members for effecting snap action pivotal movement of said electric contact element in response to movement of at least one of said operating members.

3. A control device of the character described comprising motion translating means including a fixed outer sleeve, a movable sleeve member disposed concentrically within said fixed sleeve, and an elongated movable member disposed concentrically within said movable sleeve member, said members extending beyond said fixed sleeve and being adapted to move both independently and conjointly, an electric switch having a movable electric contact element operatively supported on one of said members for pivotal movement between "on" and "off" positions, and spring means associated with said contact element for shifting the latter in response to movement of at least one of said members.

4. A control device of the character described comprising motion translating means including a pair of elongated movable members arranged for both independent and conjoint longitudinal movement, an electric switch having an elongated switch arm operatively supported on one of said members for pivotal movement between "on" and "off" positions, and spring means coacting with said switch arm at a point removed from the fulcrum of said arm for effecting pivotal movement of the latter in response to longitudinal movement of at least one of said members.

5. A control device of the character described comprising motion translating means including a pair of longitudinally movable operating members adapted to move both independently and conjointly, fixed electric contact means, and means carried by said operating members including a movable switch arm cooperating with said contact means and a bowed spring connected at one end to said switch arm and having its other end movable transversely across the longitudinal axis of said switch arm for effecting shifting movement of the latter between "on" and "off" positions in response to longitudinal movement of at least one of said members.

6. A control device of the character described comprising motion translating means including a pair of longitudinally movable operating members adapted to move both independently and conjointly, an electric switch having an elongated switch arm operatively connected adjacent one end thereof to one of said operating members for pivotal movement about said one end, said arm carrying an electric conductor element at its opposite end for completing an electric circuit, and a bowed spring operatively connected to one of said operating members and to said switch arm for pivoting the latter with a snap action in response to longitudinal movement of at least one of said operating members.

7. A control device of the character described comprising motion translating means including a pair of inner and outer operating members disposed concentrically for both independent and conjoint sliding movement, an electric switch having a movable switch arm fulcrumed on one of said operating members for pivotal movement between "on" and "off" positions, and snap action spring means coacting with the other of said operating members and with said switch arm for shifting the latter in response to movement of at least one of said operating members.

8. A control device of the character described comprising motion translating means including a pair of movable operating members adapted to move both independently and conjointly, an electric switch having a movable electric contact element in operative engagement with one of said operating members for pivotal movement between "on" and "off" positions, spring means coacting with said electric contact element and with one of said movable operating members for shifting said electric contact element from "on" to "off" position in response to movement of at least one of said operating members, and manually operable reset means including an elongated reset arm having means for camming said movable electric contact element to effect pivotal movement of the latter toward "on" position upon actuation of said reset arm.

9. A control device of the character described comprising motion translating means including a pair of movable operating members adapted to move both independently and conjointly, an electric switch having a movable electric contact element in operative engagement with one of said operating members for pivotal movement between "on" and "off" positions, spring means coacting with said electric contact element and with one of said movable operating members for shifting said electric contact element from "on" to "off" position in response to movement of at least one of said operating members, and manually operable reset means including a shiftable actuating member having cam means coacting with said movable electric contact element, said cam means being adapted to shift said movable electric contact element to an intermediate position between "off" and "on" positions upon movement of said actuating member in one direction and said spring means being adapted to complete the shifting of said movable electric contact element to "on" position upon return movement of said actuating member in the opposite direction.

10. A control device of the character described comprising motion translating means including a pair of movable operating members adapted to move both independently and conjointly, an electric switch having a movable electric contact element in operative engagement with one of said operating members for pivotal movement between "on" and "off" positions, spring means coacting with said electric contact element and with one of said movable operating members for shifting said electric contact from "on" to "off" position in response to movement of at least one of said operating members, reset means manually shiftable into engagement with said electric contact element for restoring the latter to "on" position, and spring means coacting with said reset means for normally urging the latter out of engagement with said electric contact element whereby said reset means is automatically disengaged from said electric contact element upon release of said reset means.

11. A control device of the character described comprising motion translating means including a fixed outer sleeve, a movable inner sleeve member disposed concentrically within said fixed sleeve, and an elongated movable member disposed concentrically within said inner sleeve member, said inner sleeve member and said elongated movable member being provided with complementary slot and recess portions respectively, and said members being arranged for both independent and conjoint movement, an electric switch having an electric contact element operatively supported on one of said members for pivotal movement between "on" and "off" positions in response to movement of at least one of said members, and means for limiting the extent of movement of said members and for preventing relative rotation thereof comprising an adjustable element projecting rigidly from said fixed outer sleeve through said slot portion in said movable inner sleeve member and into said recess portion in said elongated movable member.

12. A control device of the character described comprising motion translating means including a pair of movable operating members adapted to move both independently and conjointly, fixed electric contact means, a movable switch arm carried by said operating members for cooperation with said contact means, a swingable member carried by said operating members, and a bowed spring connected at one end to said swingable member and to its other end to said switch arm for actuating the latter.

13. A control device of the character described comprising motion translating means including a fixed outer sleeve, a movable inner sleeve member, and an elongated movable member disposed within said inner sleeve member, said members being adapted to move both independently and conjointly, fixed electric contact means, a movable switch arm carried by said movable sleeve member for cooperation with said contact means, swingable means carried by said movable sleeve member and operatively connected to said elongated movable member, and a bowed spring connected at one end to said swingable means and at its other end to said switch arm for actuating the latter in response to movement of at least one of said members.

14. A control device of the character described comprising motion translating means including a pair of inner and outer movable operating members adapted to move both inependently and conjointly, an electric switch having an elongated switch arm pivotally supported adjacent one end thereof on said outer movable operating member for pivotal movement between "on" and "off" positions, said switch arm carrying an electric conductor adjacent the opposite end thereof for completing an electric circuit, and a bowed spring having one end engaged with said inner movable operating member and its other end engaged with said switch arm adjacent said opposite end thereof for effecting snap action pivotal movement of said switch arm in response to movement of at least one of said operating members whereby to shift one end of said bowed spring into overcenter relation with respect to said switch arm.

15. A control device of the character described comprising motion translating means including a pair of movable operating members arranged for both independent and conjoint movement, an electric switch having a movable electric contact element operatively supported on one of said members for pivotal movement between "on" and "off" positions, a bowed spring coacting with said movable electric contact element for shifting the latter in response to movement of at least one of said operating members, and movable abutment means disposed adjacent said movable electric contact element and said bowed spring, said abutment means being adapted to be disposed in the path of movement of said bowed spring and engageable therewith in one position thereof and being shiftable to a different position wherein said abutment means is disposed out of the path of movement of said spring.

16. A control device of the character described comprising motion translating means including a pair of movable members arranged for both independent and conjoint movement, an electric switch having a movable electric contact element operatively supported on one of said members for pivotal movement between "on" and "off" positions, a bowed spring coacting with said movable electric contact element for shifting the latter in response to movement of at least one of said members, a rotatable pedestal disposed below said movable electric contact element and said bowed spring and having a transversely extending bar at the upper end thereof, said bar being disposed in the path of movement of said bowed spring and engageable therewith in one rotary position of said pedestal whereby to limit the extent of movement of said electric contact element, and said pedestal being rotatable to a different rotary position whereby said bar is disposed out of the path of movement of said spring, and retaining means for releasably holding said pedestal in either of said rotary positions.

17. A control device of the character described comprising a switch housing, an elongated switch arm pivotally mounted within said housing, actuating means for said switch arm operatively connected therewith for pivotal movement of the switch arm from "on" to "off" position, and manually operable reset means for effecting pivotal movement of said switch arm from "off" to "on" position, said reset means comprising an elongated shiftable member extending into said switch housing and provided with cam surfaces including a sloping portion and a straight portion, said sloping portion being adapted to coact with the adjacent end of said switch arm upon inward movement of said shiftable member whereby to pivot said switch arm toward "on" position and said straight portion being adapted to engage another portion of said switch arm for preventing the latter from reaching "on" position while said shiftable member is depressed inwardly of said housing, and spring means cooperating with said shiftable member for moving the latter outwardly of said housing whereby to disengage said straight portion of said cam surfaces from said switch arm and thereby permit the latter to reach "on" position.

18. A control device of the character described comprising motion translating means including a pair of concentric movable members arranged for both independent and conjoint telescoping movement, a pair of inner and outer yokes carried by said movable members, rockable means operatively supported on one of said yokes and operatively connected to the other of said yokes, an electric switch having a switch arm pivotally supported on said rockable means for movement between "on" and "off" positions, and spring means coacting between said rockable means and said switch arm for shifting the latter in response to actuation of at least one of said movable members.

19. A control device of the character described comprising motion translating means including a movable sleeve member and an elongated movable member disposed concentrically within said sleeve member, said members being arranged for both independent and conjoint movement, a pair of inner and outer yokes each having spaced parallel depending leg portions, said inner yoke being secured to said elongated movable member and said outer yoke being secured to said sleeve member, a rockable member journaled between the leg portions of said outer yoke, an electric switch having an elongated switch arm pivotally mounted at one end thereof on said rocker member, bowed spring means coacting with said switch arm and with the opposite end of said rocker member for effecting snap action pivotal movement of said switch arm in response to actuation of said motion translating means, and spring-actuated means for shifting the position of said rocker member in response to movement of said switch arm.

20. A control device of the character described comprising motion translating means including a pair of inner and outer yoke members arranged for both independent and conjoint movement, an electric switch having an elongated switch arm operatively supported on one of said yoke members for pivotal movement between "on" and "off" positions, rockable means operatively interconnecting said yoke members, bowed spring means coacting between said rockable means and said switch arm for effecting snap action pivotal movement of the latter in response to actuation of said motion translating means, and a spring-actuated bell crank operatively connected to said switch arm and to said rockable means for effecting pivotal movement of the latter in response to shifting of said switch arm, said switch arm being in "on" position when said rockable means is disposed in one of its pivoted positions and said switch arm being in "off" position when said rockable means is disposed in its oppositely pivoted position.

21. A control device of the character described comprising motion translating means including a pair of inner and outer movable members arranged concentrically for both independent and conjoint movement, a pair of inner and outer yokes having spaced parallel depending leg portions, said inner and outer yokes being attached to said inner and outer movable members respectively, an elongated rocker journaled between the depending leg portions of said outer yoke, an electric switch having an elongated switch arm pivotally carried at one end thereof by one end of said rocker, a bowed spring operatively connecting the opposite end of said rocker with said switch arm for effecting snap action pivotal movement of the latter in response to actuation of said motion translating means, a bell crank pivotally mounted adjacent the lower end of said outer yoke, one of the legs of said bell crank being operatively and slidably interconnected with said inner yoke and with said rocker, and spring means coacting between said one end of said rocker and the other leg of said bell crank whereby to effect pivotal movement of said bell crank and said rocker in response to shifting of said one end of said switch arm, each movement of said switch arm between "on" and "off" positions thereby being accompanied by pivotal movement of said rocker to its oppositely pivoted position whereby successive actuation of said motion translating means result in successive shifting movement of said switch arm between "on" and "off" positions.

22. A control device of the character described comprising motion translating means including a pair of movable members arranged concentrically for both independent and conjoint movement, an electric switch having an elongated switch arm fulcrumed adjacent its central portion on one of said members for pivotal movement between "on" and "off" positions, said switch arm carrying an electric conductor adjacent one end thereof for completing an electric circuit, and spring means operatively connecting said other member and the opposite end of said switch arm for shifting the latter in response to movement of at least one of said members.

23. A control device of the character described comprising motion translating means including a pair of movable members arranged concentrically for both independent and conjoint movement, an electric switch having an elongated switch arm fulcrumed adjacent its central portion on one of said members for pivotal movement between "on" and "off" positions, yoke means operatively engaged with the other of said movable members, and bowed spring means having one end thereof operatively connected to said yoke means and the opposite end thereof operatively connected to the opposite end of said switch arm whereby to effect snap action pivotal movement of the latter in response to movement of at least one of said members.

24. A control device of the character described comprising motion translating means including a pair of movable members arranged concentrically for both independent and conjoint movement, an electric switch having a movable electric contact element operatively supported on one of said members for pivotal movement from "on" to "off" position in response to actuation of at least one of said members, and manually operable reset means for shifting said movable electric contact element from "off" to "on" position, said reset means including an elongated reset arm shiftably mounted adjacent said movable electric contact element, said arm being provided with a cam slot, and a cam follower projecting outwardly from said movable electric contact element and extending into said cam slot for coaction therewith upon shifting movement of said reset arm.

25. A control device of the character described comprising motion translating means including a pair of movable members arranged concentrically for both independent and conjoint movement, an electric switch having a switch housing and an elongated switch arm operatively connected with said members for pivotal movement from "on" to "off" position in response to actuation of said motion translating means, and manually operable reset means for effecting pivotal movement of said switch arm from "off" to "on" position, said reset means including an elongated shiftable reset arm extending inwardly through said housing adjacent said switch arm, spring means normally urging said reset arm outwardly of said housing, and cam means coacting between said reset arm and said switch arm for effecting pivotal movement of the latter in response to shifting movement of said reset arm, said cam means comprising a generally triangular cam slot provided in said reset arm and having a sloping portion and a horizontal portion, and a cam follower projecting outwardly from said switch arm and extending into said cam slot, said sloping portion coacting with said cam follower upon inward movement of said reset arm against the action of said spring means whereby to shift said switch arm toward "on" position, and said horizontal portion of said cam slot engaging said cam follower to prevent said switch arm from reaching "on" position while said reset arm is in inwardly depressed position, and said reset arm being shiftable outwardly of said housing by said spring means upon release thereof whereby to disengage said horizontal portion of said cam slot from said cam follower and thereby permit said switch arm to reach "on" position.

FREDERICK O. JOHNSON.

REFERENCES CITED

The following references are of record in the file of this patent:

UNITED STATES PATENTS

| Number | Name | Date |
|---|---|---|
| 1,782,937 | Perry | Nov. 25, 1930 |
| 1,784,437 | Harlow | Dec. 9, 1930 |
| 2,135,864 | Weber | Nov. 8, 1938 |
| 2,170,748 | Eaton | Aug. 22, 1939 |
| 2,424,527 | Whyte et al. | July 22, 1947 |
| 2,482,487 | Johnson | Sept. 20, 1949 |
| 2,487,725 | Platz | Nov. 8, 1949 |